United States Patent
Bates et al.

(10) Patent No.: US 6,772,397 B1
(45) Date of Patent: Aug. 3, 2004

(54) METHOD, ARTICLE OF MANUFACTURE AND APPARATUS FOR DELETING ELECTRONIC MAIL DOCUMENTS

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 09/591,982

(22) Filed: Jun. 12, 2000

(51) Int. Cl.[7] .............................................. G06F 17/00
(52) U.S. Cl. ................................... 715/530; 709/206
(58) Field of Search ................................ 715/526, 513, 715/512; 713/201; 710/5; 709/313, 245, 207, 206

(56) References Cited

U.S. PATENT DOCUMENTS 5,905,863 A * 5/1999 Knowles et al. ............ 709/206
6,631,398 B1 * 10/2003 Klein ........................... 709/206

\* cited by examiner

*Primary Examiner*—Joseph Feild
*Assistant Examiner*—James H Blackwell
(74) *Attorney, Agent, or Firm*—Moser, Patterson, & Sheridan, LLP

(57) ABSTRACT

A method, article of manufacture, and apparatus for deleting electronic mail (e-mail) documents. Specifically, the method selects a first e-mail document having a primary message and at least one contained message, determines whether a second e-mail document is substantially similar to one of the contained messages, and deletes the first e-mail document and the second e-mail document that is substantially similar to one of the contained messages. As such, the method not only deletes the selected e-mail document but also e-mail documents that are substantially similar to one of the contained messages.

27 Claims, 6 Drawing Sheets

US 6,772,397 B1

METHOD, ARTICLE OF MANUFACTURE AND APPARATUS FOR DELETING ELECTRONIC MAIL DOCUMENTS

BACKGROUND OF THE INVENTION

1. Field of the Invention

The invention relates to electronic mail systems and, more particularly, the invention relates to a method, article of manufacture and apparatus for deleting electronic mail documents.

2. Background of the Related Art

In today's electronic mail (e-mail) environment, many users often utilize a "reply with history" feature to reply or forward an e-mail message with the contents of a received e-mail message. The reply with history feature is used to send an e-mail document having a primary message from the sender and contained messages previously received by the sender. The primary message and contained messages form a history of messages or a message sequence in the e-mail document. As such, such an e-mail document provides a flow of ideas and information among users.

However, repeated application or utilization of the reply with history feature may lead to many e-mail documents having a long history of contained e-mail messages. In particular, a recipient or user may often accumulate extraneous e-mail documents over time. Moreover, these e-mail documents are likely to accumulate if the e-mail documents covered an important subject, e.g., e-mail documents are accumulated over the duration of an essential business project. In this case, the user would need to consider whether to delete each accumulated e-mail document individually. As such, the user is required to waste a substantial amount of time, particularly if the user opens each of the accumulated e-mail documents on an individual basis.

Therefore, a need exists for a method, article of manufacture and apparatus for assisting in a determination of which e-mail documents to delete.

SUMMARY OF THE INVENTION

The invention provides a method, article of manufacture and apparatus for deleting electronic mail (e-mail) documents. Specifically, the method comprises selecting a first e-mail document having a primary message and at least one contained message, determining whether a second e-mail document is substantially similar to one of the contained messages, and deleting the first e-mail document and the second e-mail document if the second mail document is substantially similar to one of the contained messages. As such, one embodiment of the method not only deletes the selected e-mail document, but also e-mail documents that are substantially similar to one of the contained messages.

In another embodiment, the invention also provides an apparatus comprising a memory and a processing unit, where the apparatus is configured for deleting e-mail documents. The memory stores a plurality of e-mail documents and a delete routine.

The processing unit executes the delete routine retrieved from the memory, selects a first electronic mail document having a primary message and at least one contained message, determines whether other e-mail documents are substantially similar to one of the contained messages, and deletes the selected e-mail document. The other e-mail documents are deleted if the other e-mail documents are substantially similar to one of the contained messages.

Additionally, a computer readable medium storing a software program is provided, where the software program, when executed by a computer, causes the computer to perform a method. In one embodiment of the computer readable medium, the method comprises selecting a first electronic mail document having a primary message and at least one contained message, identifying a second electronic mail document that is substantially similar to one of the contained messages, and deleting the first electronic mail document and the second electronic mail document if the second electronic mail document is substantially similar to one of the contained messages.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
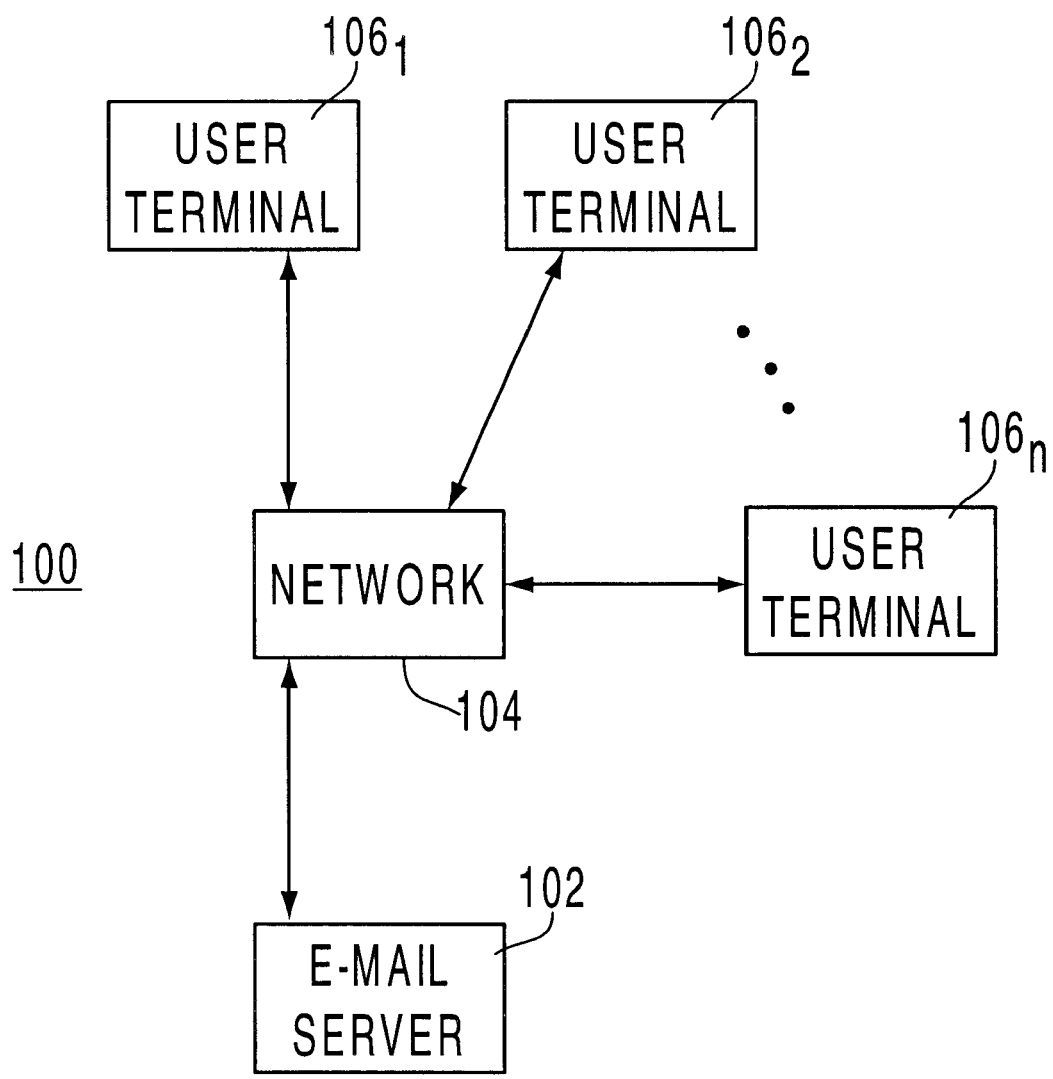
FIG. 1 depicts a simplified block diagram of an electronic mail (e-mail) system that benefits from the present invention.

FIG. 1 depicts an electronic mail (e-mail) system 100 that benefits from the use of the present invention. One embodiment of the present invention comprises an executable software routine(s) that generally resides within the user terminals 106. The system 100 comprises an e-mail server 102, a network 104 and a plurality of user terminals $106_1$, $106_2$, . . . $106_n$. Each user terminal may be a computer system, an e-mail enabled network appliance, an e-mail enabled wireless device and the like. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server 102. Each user terminal 106 may then retrieve its e-mail from the e-mail server 102. Although the system is shown having a hub and spoke configuration, other forms of networks may also benefit from the invention.

Figure 2:
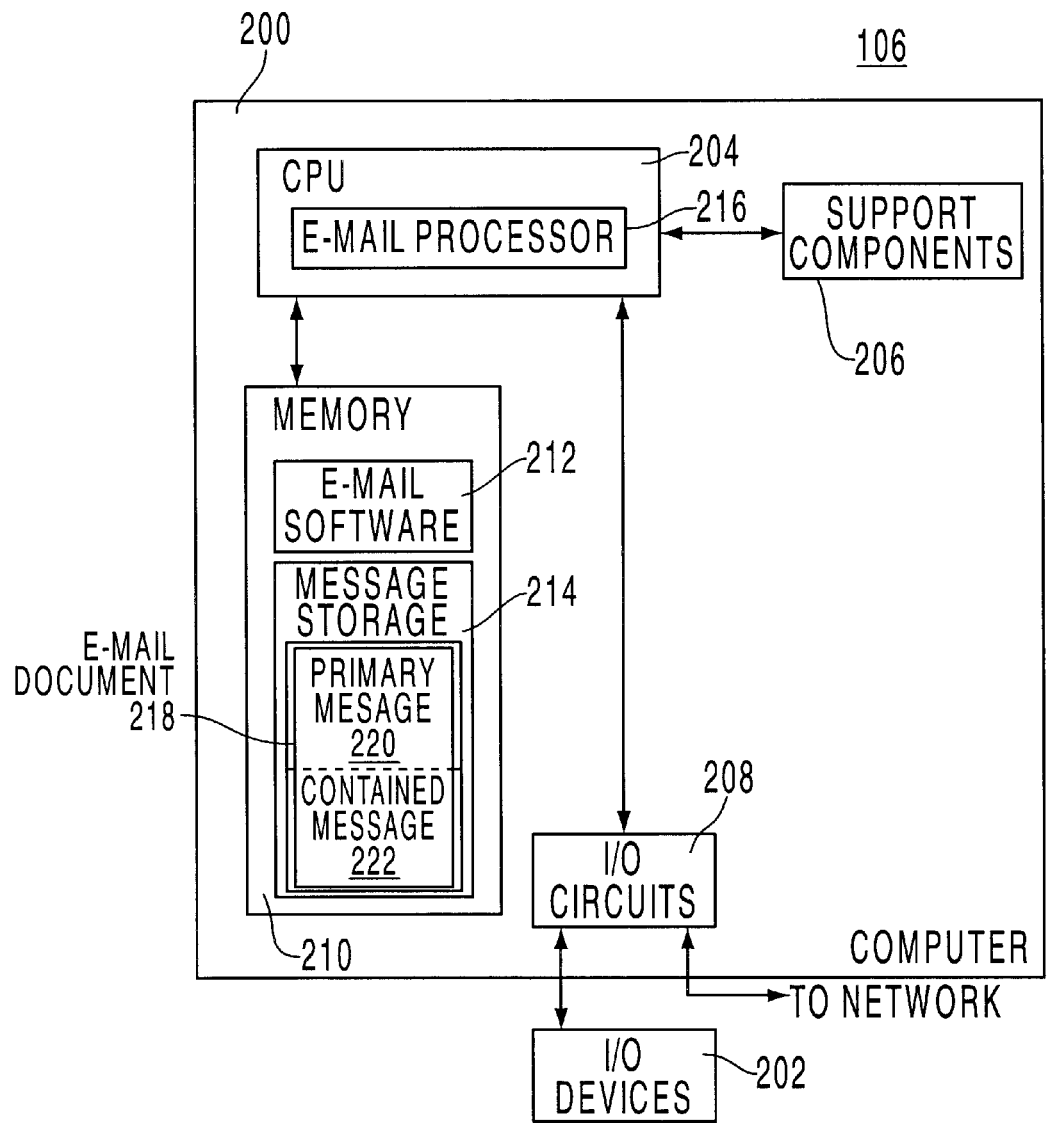
FIG. 2 depicts a simplified functional block diagram of a user terminal (computer) within the electronic mail system of FIG. 1.

FIG. 2 depicts a functional block diagram of a user terminal 106, e.g., a general purpose computer system. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory 210. The memory 210 may be a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such circuits as cache, power supplies, clock circuits, and the like. The combination of all of these circuits, components and elements forms a general purpose computer that, when executing a particular software package or routine, is a specific purpose computer. In this case, the CPU 204, when executing the electronic mail processing software 212 of the present invention, operates as an e-mail processor 216. The e-mail software 212 resides in memory 210. In addition, e-mail documents 218 are stored in a message storage 214 within the memory 210. In addition, the I/O circuits 208 generally contain a network interface card or modem that couples the computer to the network of FIG. 1 such that e-mail messages can be routed to and from the computer 200.

Figures 2A, 2B:
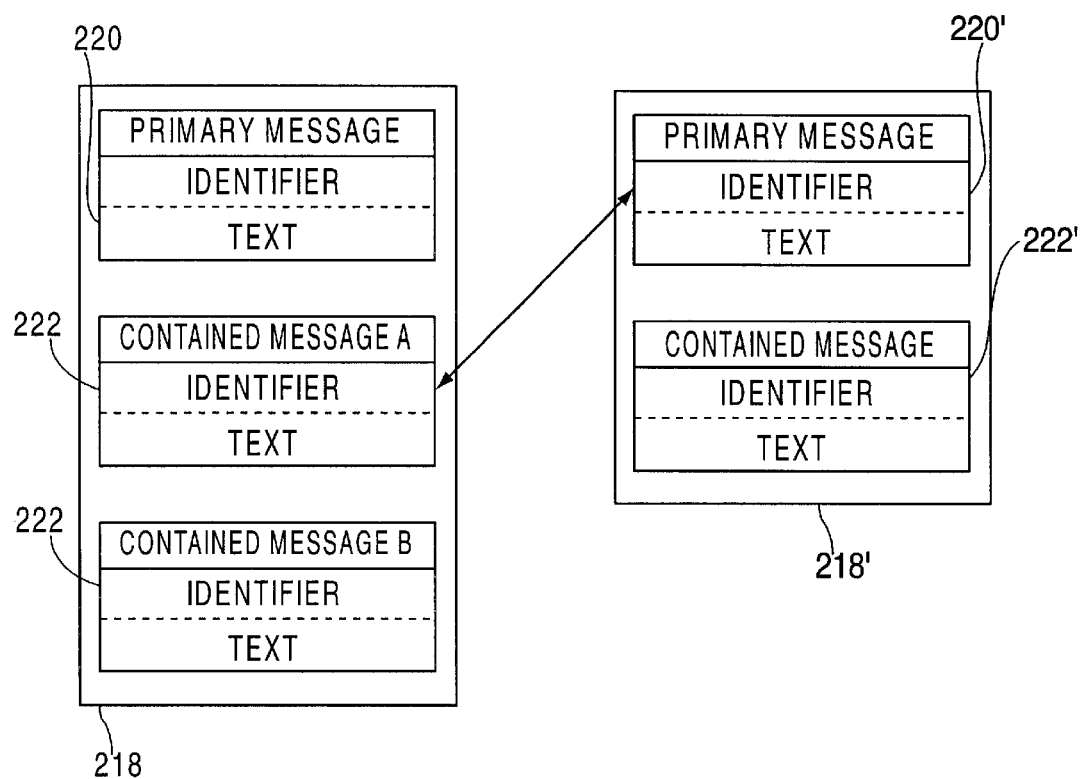
FIG. 2A depicts an exploded view of an e-mail document of FIG. 2.
FIG. 2B depicts an e-mail document that is compared with the e-mail document of FIG. 2A.

In one embodiment of the invention, the e-mail processor 216 selects an e-mail document 218 having a primary message 220 and at least one contained message 222. The primary message 220 represents the latest or last e-mail message in the e-mail document 218. Each contained message 222 represents an earlier e-mail message in the e-mail document 218. The contained messages 222 may represent e-mail messages that have been previously sent, e.g., forwarded or replied to, using the reply with history feature. FIG. 2A depicts an exploded view of an illustrative e-mail document 218 having a primary message 220 and two contained messages 222.

The e-mail processor 216 also determines whether a second electronic mail document is substantially similar to one of the contained messages 222. To perform this determination, the e-mail processor 216 may utilize an identifier field in the primary message 220 and the contained messages 222. FIG. 2B depicts an e-mail document 218' that is compared with the e-mail document 218 of FIG. 2A. Specifically, the second electronic mail document 218' is substantially similar to one of the contained messages 222 if the identifier field of a contained message 222 is substantially similar to the identifier field of a primary message 220' a second electronic mail document 218'. The identifier field may include user information, subject information, timestamp information and the like. User information may include a TO: field and a FROM: field, timestamp information may include date and time of a primary or contained message, and subject information may include the title or subject of a primary or contained message. Other identifiers or identifier fields, such as a control word or a hidden variable not visible to a user, are also contemplated within the scope of the present invention.

Additionally, the e-mail processor 216 deletes the selected e-mail document and the second e-mail document that is substantially similar to one of the contained messages. As such, the e-mail processor 216 not only deletes the selected e-mail document, but also the identified e-mail documents that are substantially similar to any of the contained messages.

As will be described in detail below, another embodiment of the invention is implemented as a program product for use with a computer system such as, for example, the system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 3:
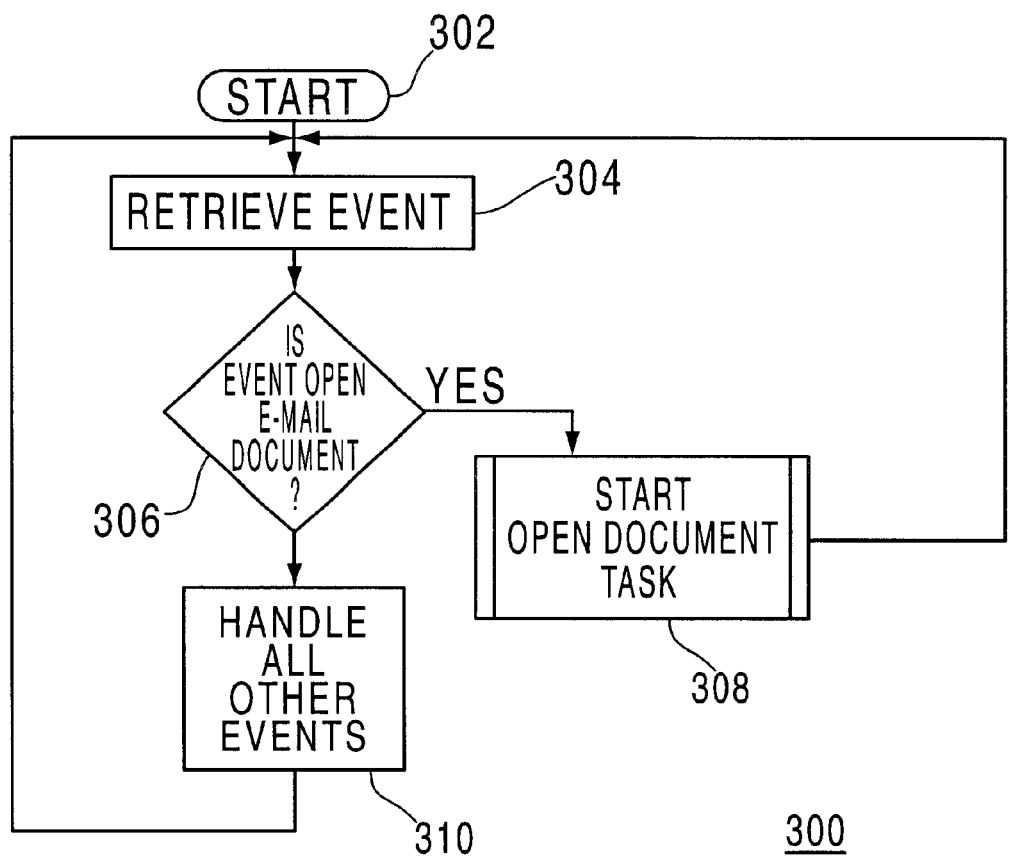
FIG. 3 depicts a flow diagram of a mail program.
Figure 4:
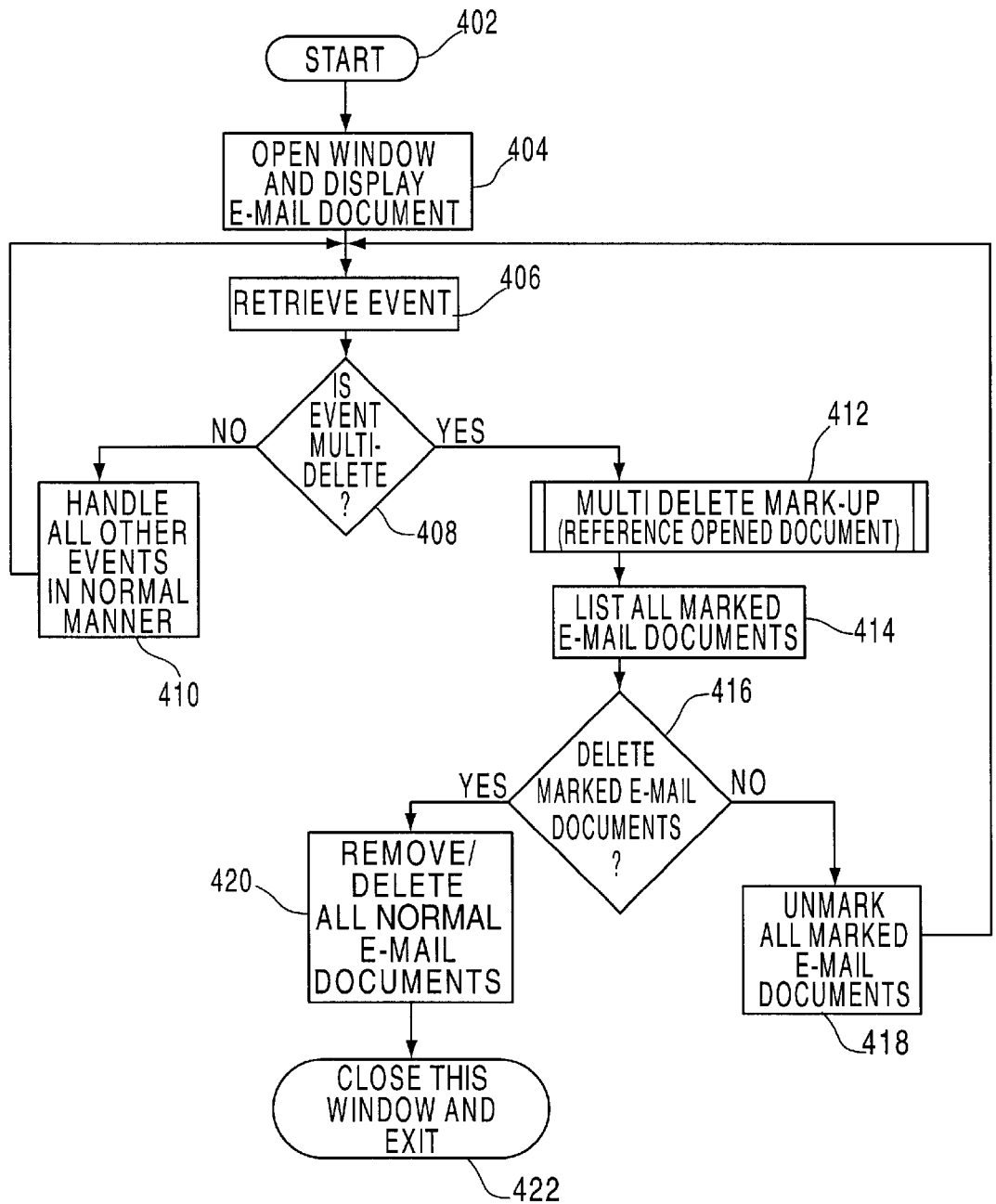
FIG. 4 depicts a flow diagram of a mail program for handling an opened e-mail document.
Figure 5:
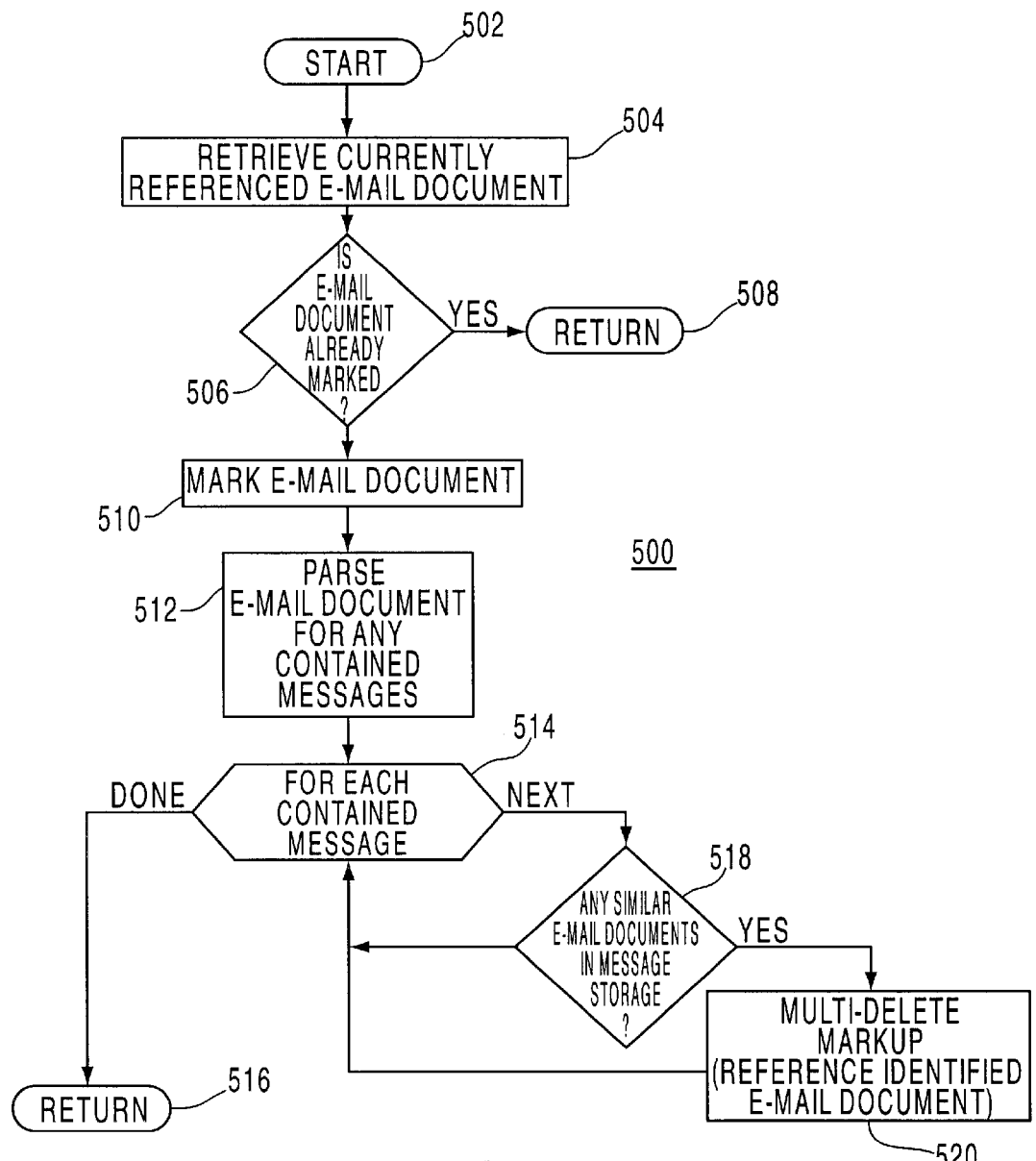
FIG. 5 depicts a flow diagram of the mail program for implementing a delete feature of the present invention.

FIG. 3 depicts a flow diagram of a mail program. FIG. 4 depicts a flow diagram of a mail program for handling an opened message. FIG. 5 depicts a flow diagram of the mail program for implementing a delete feature of the present invention. To best understand the invention, the reader should simultaneously refer to FIGS. 3–5.

Referring to FIG. 3, the mail program is embodied in a method 300 that starts at step 302 and proceeds to retrieve an event at step 304. Such events may represent a particular command from a user, e.g., opening an e-mail document, deleting e-mail document in accordance with the present invention, or confirming the deletion of marked e-mail document. The method 300 operates in an event-driven manner, i.e., the method 300 retrieves events and performs different steps depending on a particular event retrieved.

At step 306, the method 300 queries whether the event is to open an e-mail document. In the context of the present invention, the e-mail document 218 may comprise a primary message 220 and at least one contained message 222.

If the event is to open an e-mail document, the method 300 proceeds to step 308, where an open message task is initiated. The open message task is embodied in a method 400 described below with respect to FIG. 4. This open message task may be processed independently of method 300. After starting the open message task, the method 300 retrieves the next event at step 304. If the event is not to open an e-mail document, the method 300 proceeds to handle other events at step 310 and retrieve the next event at step 304.

Referring to FIG. 4, the method 400 embodies an open message task entered from step 308 and may be processed independently of method 300. More specifically, method 400 starts at step 402, and proceeds to step 404, where a window is opened and the opened e-mail document 218 is displayed in the window. The method 400 proceeds to retrieve an event at step 406.

At step 408, the method 400 determines whether the event is to perform a delete function, e.g., multi-delete, of the present invention. If the event is not to perform the multi-delete function, the method 400 proceeds to normally handle other events in step 410 and retrieve the next event at step 406. If the event is to perform the multi-delete function, the method 400 proceeds to step 412, where a multi-delete markup is performed on the opened e-mail document. Namely, step 412 marks all e-mail documents in the message storage 214 that are identified as being at least substantially similar to a contained message 222 of the opened e-mail document 218. Step 412 is embodied in a method 500 described below with respect to FIG. 5. In one embodiment, an e-mail document is identified as being substantially similar to a contained message if the identifier field of the contained message is substantially similar to that of a primary message in the identified e-mail document. Various identifier fields are possible as previously discussed with respect to step 306.

After performing the multi-delete markup at step 412, the method 400 proceeds to step 414, where a list all of the marked e-mail documents is provided, e.g., on a display device 202. At step 416, the method 400 determines whether to delete the marked e-mail documents. Step 416 may be implemented as a pre-selected mode or as a screen prompt requiring user selection. In some embodiments, the user may deselect one or more of the marked e-mail documents. If the marked e-mail documents are not to be deleted, the method 400 proceeds to unmark the marked e-mail documents at step 418 and retrieve the next event at step 406. If the marked e-mail documents are to be deleted, the method 400 proceeds to delete or remove all marked e-mail documents at step 420. The method 400 proceeds to close the window and exit the method 400 at step 422.

Referring to FIG. 5, the method 500 embodies the delete feature, i.e., multi-delete markup, of the present invention. The method 500 is entered from step 412 and starts at step 502. The method 500 proceeds to step 504, where the e-mail document 218 is referenced or handled as the current e-mail document. Note that FIG. 5 is recursive in nature, i.e., the method 500 initially applies to the opened e-mail document 218, but also applies to each identified e-mail document 218', i.e., an e-mail document 218' that is identified as being substantially similar to a contained e-mail message 222.

At step 506, the method 500 determines whether the currently referenced e-mail document is already marked, e.g., an e-mail document 218' identified as substantially similar to a contained message 222. If the currently referenced e-mail document is already marked, the method 500 proceeds to return to a previous routine or method at step 508. Namely, the method 500 proceeds to step 412 if the currently referenced e-mail document is the opened e-mail document 218, or proceeds to step 514 if the currently referenced e-mail document is an identified e-mail document 218'.

If the currently referenced e-mail document is not already marked, the method 500 marks the currently referenced e-mail document at step 510 and parses the currently referenced e-mail document to extract any contained messages at step 512. Specifically, the parsing separates the e-mail document 218 into contained messages 222, where the method 500 may individually process each contained message. The method 500 proceeds to step 514, where the method 500 queries whether any contained messages are present in the currently referenced document. Step 514 is performed for each contained message 222 in the opened e-mail document 218 or the identified e-mail document 218'.

If the currently referenced e-mail document has no contained messages or has no further contained messages to process, the method 500 proceeds to step 516, where the method 500 returns to a previous routine or method, e.g., at step 412.

If the currently referenced e-mail document has a contained message to process, the method 500 proceeds step 518, where a query determines whether an identified e-mail document 218' is in the message storage 214. Namely, step 518 identifies whether the contained message 222 is substantially similar to another e-mail document 218' in the message storage 214. Such identified e-mail documents generally include undeleted messages and more specifically may include unopened e-mail messages, previously opened e-mail messages and previously sent messages. In one embodiment of the present invention, an identified e-document 218' is substantially similar to a contained message 222 if the identifier field of the contained message 222 is substantially similar to the identifier field of a primary message 220' in the identified e-mail document 218'.

Examples of the identifier field include those previously discussed with respect to steps 306 and 412.

If an identified e-mail document is not in the message storage 214, the method 500 proceeds to process the next contained message at step 514. If an identified e-mail document 218' is in the message storage 214, the method 500 proceeds to step 520, where the multi-delete markup is (recursively) performed on the identified e-mail document 218'. This step 520 is the same as step 412 except step 520 is performed on the identified e-mail document 218' that is substantially similar to a contained message 222. Step 520 may be processed recursively if the identified e-mail document 218' comprises additional contained messages 222'. After performing the multi-delete markup for the identified e-mail document 218', the method 500 proceeds to process the next contained message 222 at step 514.

Although the delete feature of the present invention was described in the context of an opened e-mail document, the present invention may similarly apply to any selected e-mail document, e.g., e-mail documents that a user selects to delete without opening.

Although various embodiments which incorporate the teachings of the present invention have been shown and described in detail herein, those skilled in the art can readily devise many other varied embodiments that still incorporate these teachings.

What is claimed is:

1. A method for deleting electronic mail documents addressed to, and received by, a recipient, comprising:
   receiving a first electronic mail document having a primary message and at least one contained message;
   opening the first electronic mail document;
   initiating a deletion routine configured to ensure deletion of related e-mails with respect to the opened first electronic mail document, the routine comprising:
      determining whether a second electronic mail document, also addressed to and received by the recipient includes a primary message that is substantially similar to the at least one contained message; and
      deleting the first electronic mail document, and the second electronic mail document if the primary message of the second electronic mail document is substantially similar to the at least one contained message; wherein the primary messages are the current messages of the respective electronic messages and the at least one contained a message is a historical message of the first electronic mail document.

2. The method of claim 1 wherein the determining and deleting are repeated for each of the contained messages of the first electronic mail document.

3. The method of claim 1 wherein the determining and deleting are recursively performed on the second electronic mail document if the second electronic mail document comprises at least one contained message.

4. The method of claim 1 wherein the determining comprises identifying the primary message of the second electronic mail document that is substantially similar to the at least one contained message.

5. The method of claim 4 wherein the identifying occurs if the primary message of the second electronic mail document has a substantially similar identifier field as the at least one contained message.

6. The method of claim 5 wherein the identifier field comprises at least one from the group of user information, subject information and timestamp information.

7. The method of claim 1 wherein the determining comprises parsing the first electronic mail document into the at least one contained message.

8. The method of claim 1 wherein the determining is performed for each of the at least one contained message of the first electronic mail document.

9. The method of claim 1 wherein the second electronic mail document comprise at least one electronic mail document from the group of previously opened, unopened and previously sent electronic mail messages.

10. The method of claim 1 wherein the deletion routine is initiated in response to an election, by a user, to delete the first electronic mail document.

11. The method of claim 1 wherein the deleting comprises:
   marking the first electronic mail document and the second electronic mail document that is substantially similar to the at least one contained message; and
   deleting the marked electronic mail documents upon confirmation from a user.

12. The method of claim 11 wherein the marked electronic mail documents are displayed on a list.

13. An apparatus for deleting electronic mail documents comprising:
   a memory for storing (i) a plurality of received electronic mail documents addressed to a recipient and (ii) a delete routine; and
   a processing unit, coupled to the memory, for executing the delete routine retrieved from the memory, selecting a first electronic mail document having been received and opened by the recipient and having a primary message and at least one contained message, identifying other electronic mail documents that are also addressed to the recipient and that include primary messages that are substantially similar to the at least one contained message, and deleting the first electronic mail document and the identified electronic mail documents; wherein the primary messages are the current messages of the respective electronic mail documents and the at least one contained message is a historical message of the first electronic mail document.

14. The apparatus of claim 13 further comprising a display unit, coupled to the processing unit, for displaying the first electronic mail document and a list of the identified electronic mail documents.

15. A computer readable medium storing a software program that, when executed by a computer, causes the computer to perform a method comprising:
   selecting a first electronic mail document addressed to and opened by a recipient and having a primary message and at least one contained message;
   determining whether a second electronic mail document, also addressed to and received by the recipient, includes a primary message that is substantially similar to the at least one contained message; and
   deleting the first electronic mail document, and the second electronic mail document if the primary message of the second electronic mail document is substantially similar to the at least one contained message; wherein the primary messages are the current messages of the respective electronic mail documents and the at least one contained message is a historical message of the first electronic mail document.

16. The computer readable medium of claim 15 wherein the determining and deleting are repeated for each of the contained messages of the first electronic mail document.

17. The computer readable medium of claim 15 wherein the determining and deleting are recursively performed on the second electronic mail document if the second electronic mail document comprises at least one contained message.

18. The computer readable medium of claim 17 wherein the determining comprises identifying the primary message of the second electronic mail document that is substantially similar to the at least one contained message.

19. The computer readable medium of claim 18 wherein the identifying occurs if the primary message of the second electronic mail document has a substantially similar identifier field as the at least one contained message.

20. The computer readable medium of claim 19 wherein the identifier field comprises at least one from the group of user information, subject information and timestamp information.

21. The computer readable medium of claim 15 wherein the determining comprises parsing the first electronic mail document into the at least one contained message.

22. The computer readable medium of claim 15 wherein the determining is performed for each of the at least one contained message of the first electronic mail document.

23. The computer readable medium of claim 15 wherein the second electronic mail document comprise at least one electronic mail document from the group of previously opened, unopened and previously sent electronic mail messages.

24. The computer readable medium of claim 15 wherein the selecting comprises opening the first electronic mail document.

25. The computer readable medium of claim 15 wherein the method is initiated in response to an election, by a user, to delete the first electronic mail document.

26. The computer readable medium of claim 15 wherein the deleting comprises:
   marking the first electronic mail document and the second electronic mail document that is substantially similar to the at least one contained message; and
   deleting the marked electronic mail documents upon confirmation from a user.

27. The computer readable medium of claim 26 wherein the marked electronic mail documents are displayed on a list.

* * * * *